(12) United States Patent
Destenaves

(10) Patent No.: US 11,784,508 B1
(45) Date of Patent: Oct. 10, 2023

(54) UNINTERRUPTIBLE POWER SUPPLY SYSTEMS AND METHODS

(71) Applicant: Yves Destenaves, Carver, MA (US)

(72) Inventor: Yves Destenaves, Carver, MA (US)

(*) Notice: Subject to any disclaimer, the term of this patent is extended or adjusted under 35 U.S.C. 154(b) by 0 days.

(21) Appl. No.: 17/736,963

(22) Filed: May 4, 2022

(51) Int. Cl.
| | | |
|---|---|---|
| *H02J 9/06* | (2006.01) | |
| *H02J 7/04* | (2006.01) | |
| *H02J 7/34* | (2006.01) | |
| *B60R 16/033* | (2006.01) | |
| *H02J 7/02* | (2016.01) | |
| *H02J 7/00* | (2006.01) | |

(52) U.S. Cl.
CPC ............ *H02J 9/061* (2013.01); *B60R 16/033* (2013.01); *H02J 7/02* (2013.01); *H02J 7/04* (2013.01); *H02J 7/342* (2020.01); *H02J 7/0013* (2013.01)

(58) Field of Classification Search
CPC ..... B60R 16/033; H02J 7/0013; H02J 7/0068; H02J 7/007; H02J 7/007182; H02J 7/02; H02J 7/04; H02J 7/34; H02J 7/342; H02J 9/061

See application file for complete search history.

(56) References Cited

U.S. PATENT DOCUMENTS

| | | | |
|---|---|---|---|
| 6,624,635 B1 * | 9/2003 | Lui | H02J 9/061 324/426 |
| 10,637,280 B2 | 4/2020 | Destenaves | |
| 2007/0182368 A1 * | 8/2007 | Yang | H02J 5/00 320/110 |
| 2011/0148197 A1 * | 6/2011 | Hernandez | H02J 9/062 307/26 |
| 2018/0309164 A1 * | 10/2018 | Tang | H01M 4/366 |

\* cited by examiner

*Primary Examiner* — Levi Gannon
(74) *Attorney, Agent, or Firm* — CAPITAL PATENT & TRADEMARK LAW FIRM, PLLC

(57) ABSTRACT

Uninterruptible power supply (UPS) systems and related methods that may be used to supply power to two-way, portable radios are described. The UPS system provides full UPS functionality and a constant output voltage independent of a battery voltage and battery State of Charge (SOC).

16 Claims, 2 Drawing Sheets

UNINTERRUPTIBLE POWER SUPPLY SYSTEMS AND METHODS

FIELD OF THE INVENTION

This disclosure relates to uninterruptible power systems for two-way, portable radios used in mobile mission critical applications, for example.

INTRODUCTION

This section introduces aspects that may be helpful to facilitate a better understanding of the described invention(s). Accordingly, the statements in this section are to be read in this light and are not to be understood as admissions about what is, or what is not, in the prior art.

Mission critical, two-way portable radios are essential communication tools needed by EMT, Police, Fire Departments, and FEMA personnel (to name just a few organizations) to perform the duties of their daily operations that involve the most unexpected and critical situations. To ensure that such radios can provide uninterruptable communications, an uninterruptible power supply system is highly desirable. However, existing two-way radios depend on existing batteries and battery systems that are often the weakest element of the system.

For example, existing batteries take a long time to charge (e.g., hours) and often need replacement (i.e., their useful product cycle life is short) which increases the cost of powering and using a two-way, portable radio (hereafter, a two-way, portable radio is sometimes referred to as a "radio" for short). In instances where an existing battery needs to undergo a lengthy charging cycle or requires replacement, the radio is rendered unusable for long periods of time.

Accordingly, it is desirable to provide a reliable power supply system for such radios.

Further, it is desirable to provide a reliable power supply system for such radios that reduces the time needed to charge a battery compared to existing two-way radios and systems and is capable of supplying power during mission critical situations for a longer time period than existing two-way radios and systems.

SUMMARY OF THE INVENTION

The inventor describes several different embodiments of inventive UPS (Uninterruptible Power Supply) systems and related methods for two-way, portable radios, among other features. Such systems and related methods include an UPS and rechargeable battery cells that supply continuous electrical power for greater periods of time when compared to existing power supply systems and can be charged in minutes and not 3 to 4 hours, for example. Compared to existing systems, the inventive UPS system and related methods provide shorter charge cycles, longer operating runtimes, and longer shelf lives, thereby decreasing the total cost of operating a two-way, portable radio The inventive UPS systems supply enough power and energy to allow a radio to operate during 98% of its operating cycle, compared to 70% with existing systems (i.e., the 30% non-operational time is lost due to charging or re-charging).

In one embodiment, an inventive UPS system includes rechargeable battery cells, and an UPS that provides power to the radio. The UPS can supply a fixed regulated constant voltage independent of the cell's chemistry and the cell's state of charge (SOC) (i.e., the measured level of charge of an electric battery relative to its energy maximum capacity).

The inventor believes that the ability to supply a fixed constant voltage independent of the cell's chemistry and SOC allows a user of the radio to make use of a cell's total, stored energy for a time period that exceeds the time period provided by existing power supply systems while, at the same time, minimizing deleterious quality and noise issues (e.g., minimizing voltage swings).

In an embodiment, a UPS system includes a battery subsystem that in turn include rechargeable battery cells composed of lithium iron phosphate (LFP) or equivalent. More particularly, in an exemplary embodiment each battery cell may be composed of a LFP composition that can be configured to be charged at a 6C rate from a fully discharged state to a fully charged state in less than 10 minutes without deleteriously affecting the cycle life of the battery cells.

Further, in an embodiment the inventive UPS system may be configured to receive AC input power signals from an external, main AC power source or receive DC input power signals from an external main DC power source (e.g., from a vehicle's battery or from a portable, DC power bank) and then generate DC output power signals (after any conversion, when necessary, e.g., AC-to-DC conversion). The DC output power signals may then be applied to charge or re-charge one or more rechargeable battery cells that are part of an inventive battery subsystem.

In an embodiment, the inventive UPS systems and related methods may be further configured to supply electrical power with full UPS functionality and with a constant, regulated output voltage independent of a battery voltage and battery State of Charge (SOC) to a radio and corresponding components described herein.

In an embodiment, the inventive UPS system is configured to provide power to the radio. The external AC or DC charger may charge (i.e., supplies energy to) a fully discharged battery cell to 100% of its SOC, in less than 10 minutes, unlike 3 to 4 hours compared to existing solutions. Still further, the ratio of a runtime to a charge time of a battery cell may be at least 60 to 1, meaning a 10-minute charge would deliver a 12-hour cell runtime for powering the radio at full load (10-10-80 typical cycle, meaning 10% radio transmission, 10% radio reception, 80% radio in standby mode).

The ability to quickly charge a battery cell using the inventive UPS is believed to increase the utilization of the radio to up to 98% of the radio's operational uptime (the other 2% of the time is used for charging the battery cells) as compared to existing radios whose utilization rate is 70% (the other 30% of the time is used for charging the battery).

DETAILED DESCRIPTION, WITH EXAMPLES

Figure 1:
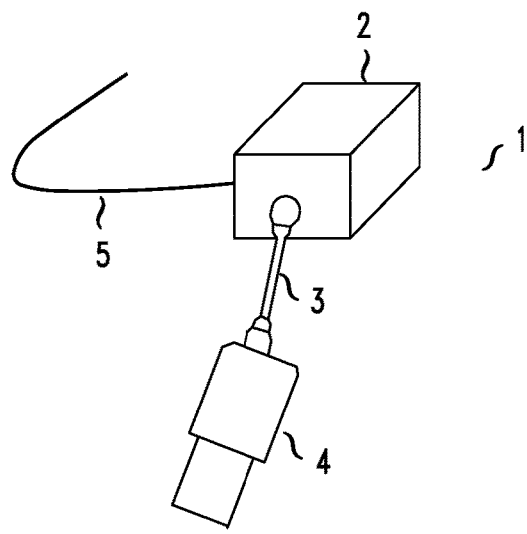
FIG. 1 is a view of an embodiment of an exemplary uninterruptible power supply (UPS) system for a two-way, portable radio, including an energy storage system for supplying electrical power with a constant regulated voltage to the radio.

Exemplary embodiments of systems, devices and related methods for supplying uninterruptible power to two-way, portable radios are described herein and are shown by way of example in the drawings. Throughout the following description and drawings, like reference numbers/characters may refer to like elements or components. It should be understood, however, that the figures are not necessarily drawn to scale and that the components shown may be exaggerated or minimized to illustrate a function or step, for example. Therefore, specific structural and functional details disclosed herein are not to be interpreted as limiting, but merely as a representative basis for teaching one skilled in the art how to variously employ the systems, devices and methods disclosed herein.

It should be understood that although specific embodiments are discussed herein, the scope of the disclosure is not limited to such embodiments. On the contrary, it should be understood that the embodiments discussed herein are for illustrative purposes, and that modified and alternative embodiments that otherwise fall within the scope of the disclosure are contemplated. Said another way, the disclosed embodiments are merely exemplary of the inventive disclosure herein that may be embodied in various and alternative forms.

It should also be noted that one or more exemplary embodiments may be described as a process or method (the words "method" may be used interchangeably with the word "process" herein). Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method if, for example, such steps are known by those skilled in the art.

It should be understood that when a system or device, or a component or element of a system or device, is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures for the sake of clarity.

It should be understood that, as used herein, the designations "first", "second", etc., is purely to distinguish one parameter, element or step in a process from another and does not indicate a priority or order. The parameters, elements or steps can sometimes be re-designated (i.e., re-numbered) and it would not affect the methods or devices provided by the present invention.

As used herein, the term "and/or" includes any and all combinations of one or more of the associated listed items. As used herein, the singular forms "a," "an" and "the" are intended to include the plural form, unless the context and/or common sense indicates otherwise.

It should be understood that the terms "comprises", "comprising,", "includes" and/or "including", when used herein, specify the presence of stated features, steps, operations, elements, and/or components, but do not preclude the presence or addition of one or more other features, steps, operations, elements, components, and/or combinations thereof.

As used herein the term "operable to" means "functions to" unless the context, common sense or knowledge of one skilled in the art indicates otherwise. More particularly, when used to describe the operation of an electronic microcontroller or controller the phrase "operable to" may mean such a microcontroller or controller and its associated memory execute stored instructions to complete certain functions.

As used herein, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It should be understood that the phrases "microcontroller" and/or "controller" mean one or more electronic devices (e.g., specialized programmed electronic processors) that is (are) operable to be specially programmed to retrieve and execute specific instructions stored as electronic signals in electronic memory, where a set of such stored specific instructions may constitute steps in an inventive process or method, or may be executed to complete an inventive function(s), such as completing the functions or steps of determining, inputting, outputting, configuring, controlling, converting, managing, balancing, protecting, sensing to name just a few of the inventive functions/processes that may be completed by executing such stored electronic instructions. Further, it should be understood that each embodiment of a microcontroller and/or controller described herein may be further configured with the necessary hardware and firmware components to enable each to process stored instructions and complete inventive functions/steps in a process-faster than humanly possible. Each of the microcontroller and controller based embodiments of the present invention cannot practically be implemented in any amount of time that would be acceptable to one skilled in the art using human beings as substitutes for such components, related processes and devices described herein. Accordingly, the use of humans as substitutes is contrary to the objectives of the invention and does not result in the improvements provided by the invention.

As used herein the terms "embodiment" or "exemplary" mean on example of an inventive system, device or method or a component or step in such an inventive system, device or method.

As used herein the phrase "full UPS functionality" means at least that a two-way portable radio is fully operational both during charging/recharging and when charging is removed or unavailable (e.g., when a charger is connected to, or disconnected from, an energy storage system described herein).

Referring now to FIG. 1 there is depicted a simplified illustration of an exemplary UPS system 1 that may be used to power at least one two-way, portable radio to name just one type of device that may be charged by the system 1.

The system 1 may include an energy storage section 4 comprising a UPS battery subsystem that can be connected to a station charger 2 (sometimes referred to simply as "charger" herein) via high power electrical cables 3. In embodiments, the charger 2 may be connected via electrical cables 5 to one or more sources of power (not shown) such as an external AC power source or an external DC power source (e.g., from a vehicle's battery or from a portable DC power bank) and then generate DC output power signals after any conversion when necessary (e.g., AC-to-DC conversion) to electrically charge the battery cells within the battery subsystem of the energy storage section 4. Thereafter, the battery subsystem within the energy storage section 4 may be configured to provide power to operate a single radio, for example, as explained in more detail herein. One example of high power cables 3 may be Anderson-type electrical cables supporting at least 30 Amperes (A).

Though not shown in FIG. 1, one or more two-way, portable radios (e.g., four when an AC main source is connected) may remain connected to, and supplied power by, the battery subsystem included in section 4, thus allowing the radio(s) to be fully operational as the radio(s) are being charged by the battery subsystem.

Figure 2:
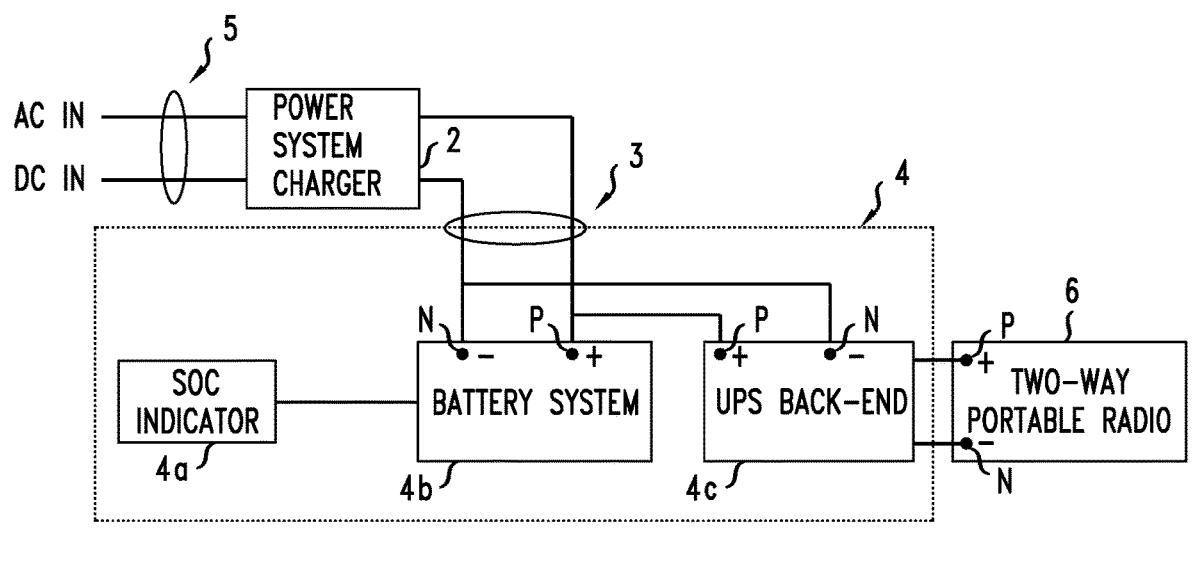
FIG. 2 is a simplified block diagram of an embodiment of the UPS system for a two-way, portable radio, including components of the energy storage system.

FIG. 2 depicts a simplified block diagram of the exemplary UPS system 1. As shown, the charger 2 may be connected by cables 5 to an AC main power source (not shown), such as a wall outlet that supplies AC input power signals rated at 115 volts (V), 15 amps (A), and 250 watts (W) to name just one type of AC main power source. Thereafter, the charger 2 may be operable to convert AC power input signals from the AC main source into an appropriate DC power output signals to charge one or more battery cells within a battery subsystem 4b of the energy storage section 4 when the charger 2 is connected to the battery subsystem 4b via cables 3.

As shown, the energy storage section 4 may comprise an SOC indication section 4a, the before-mentioned battery subsystem 4b and a UPS back-end 4c.

The charger 2 may be electrically coupled, via one or more electrical cables 3, to a positive terminal (P) and a negative terminal (N) of the battery subsystem 4b that may include one or more battery cells. Further, to provide power to the radio 6, positive (P) and a negative terminal (N) terminals of the UPS back-end 4c may be electrically coupled to corresponding positive (P) and negative terminals (N) of the two-way, portable radio 6.

In an embodiment, DC output signals from the UPS back-end 4c provides a constant regulated voltage with a full UPS functionality using the maximum energy of the battery cells within subsystem 4b.

In an embodiment, each of the one or more battery cells within subsystem 4b may be composed of an LFP composition or a composition of equivalent material, for example. More particularly, in an exemplary embodiment each battery cell may be composed of a LFP composition that can be configured to be charged at a 6C capacity rate from a fully discharged state to a fully charged state in less than 10 minutes without deleteriously affecting the cycle life of the battery cells. Said another way, each of one or more battery cells within subsystem 4b may be charged from fully discharged to a maximum allowable voltage in less than 10 minutes with a capacity rating (i.e., "C" rate) higher than a 6C charge rate (e.g., 15 amps). Collectively, the one or more battery cells within subsystem 4b may be operable to supply power (energy) to allow a radio 6 to operate at an operational uptime of 98% before the cells need to be recharged while only 2% is used for charging. Further, in an embodiment, the time required to charge the one or more battery cells within subsystem 4b may be significantly reduced, for example, to 10 minutes, when compared to existing batteries that typically require 4 hours to charge in order to allow a two-way, portable radio to operate for 12 hours at full load (typical 10-10-80 cycle).

Given the improved charging and discharging properties of the inventive UPS system 1, the inventor believes that the battery cells within subsystem 4b may have an operation life greater than 2,000 cycles (two to four times more than existing batteries). This increased lifetime is believed to reduce the operating costs of the total system.

Also shown in FIG. 2 is the SOC indicator section 4a for measuring and monitoring the SOC of the battery cells within subsystem 4b. In an embodiment, the subsystem 4b may be connected to the SOC indicator section 4a. The SOC indicator may include its own microcontroller (not shown) that is operable to control the operation of the SOC indicator section 4a, including controlling the powering of one or more LEDs that indicate a value representing the energy available from the battery cells In an embodiment, the SOC microcontroller may be connected to the power output of the battery cells in order to enable electronic signals to be exchanged between the subsystem 4b and the SOC indicator section 4a in order to allow the SOC indicator section to measure, monitor and indicate (e.g., via a LED display) the SOC of the battery cells. In embodiments, the SOC indicator section 4a may be configured to provide an SOC indication even when the battery subsystem 4b is disconnected from the radio 6.

FIGS. 1 and 2 depict the charger 2, energy storage section 4 and radio 6 as separate components of system 1. However, this is merely exemplary. In additional embodiments two or more of the components 2, 3 and 4 may be combined into one component. Alternatively, one or more of the components 2, 3 and 4 may be further separated into additional components.

Figure 3:
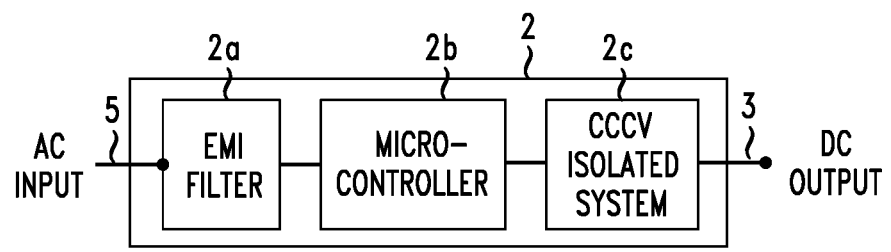
FIG. 3 is a simplified block diagram illustrating one embodiment of an exemplary charger used in the UPS power supply system of FIGS. 1 and 2.

Referring now to FIG. 3 there is shown a simplified block diagram of an exemplary charger 2. The charger 2 may include an electromagnetic interference (EMI) filter 2a, a charging microcontroller 2b, and a constant current and constant voltage (CCCV) isolation subsystem 2c connected in series, for example. The EMI filter 2a may be configured to filter (e.g., reduce or eliminate) EMI present within AC (power) input signals received via cabling 5 from a main power source (source not shown for clarity). The CCCV isolation subsystem 2c may be electrically coupled to the charging microcontroller 2b and may be configured to receive the DC output signals from the charging microcontroller 2b and output electrically isolated, DC output signals having a constant current and constant voltage sufficient to charge the batteries within subsystem 4b. In an embodiment, the CCCV isolation subsystem 2c may output such electrically isolated, DC output signals rated at 7.3V, 15 A, and 110 W per charging station to charge one set of LFP battery cells that may be packaged as a battery pack.

In an embodiment, the charger 2 may be configured to have power density (i.e., the amount of power per unit volume) equal to or greater than 1080 watts per liter (W/L).

Figure 4:
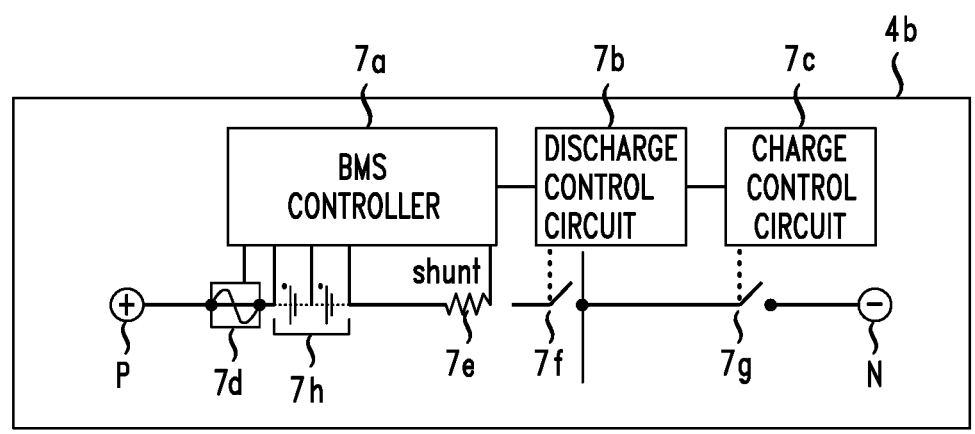
FIG. 4 is a simplified block diagram illustrating one embodiment of an exemplary rechargeable battery subsystem used in the UPS power supply system of FIGS. 1 and 2.

Referring now to FIG. 4 there is shown a simplified block diagram of a battery subsystem 4b. In an embodiment, the subsystem 4b may include an electronic fuse 7d, several battery cells 7h (e.g., LFP composed cells), a shunt 7e, discharge field-effect transistor(s) (FETs) 7f, and charge FETs 7g connected in series, for example, between the positive and negative terminals of the battery subsystem 4b.

The subsystem 4b may further comprise a battery management system (BMS) controller 7a that may be electrically coupled to the electronic fuse 7d, battery cells 7h (e.g., LFP composed cells), and the shunt 7e, in addition to discharge control circuitry 7b. In an embodiment, the discharge control circuitry 7b may be configured to operate FETs 7f and a charge control circuitry 7c. Further, the charge control circuitry 7c may be configured to operate the FETs 7g.

As noted previously, each of the cells within battery cells 7h may be composed of a LFP composition that can be configured to be charged at a 6C capacity rate from a fully discharged state to a fully charged state in less than 10 minutes without deleteriously affecting the cycle life of the battery cells.

In an embodiment, the BMS controller 7a may be configured to manage, balance, and protect the battery cells 7h from unstable conditions to, for example, permit the battery cells 7h to maximize their operating runtime, cycle and calendar life and power while operating safely.

In more detail, the BMS controller 7a may be operable to protect the battery cells 7h against variations in current and voltage. For example, in an embodiment the shunt 7e may be operable to sense the amount of current and send a signal to the BMS controller 7a representing the amount of current sensed. In an embodiment, the BMS controller 7a may be operable to compare the sensed current amount to an allowable threshold (e.g., a stored threshold) and, if the controller 7a determines that the amount of sensed current is greater than the threshold then the BMS controller 7a may be operable to send electronic signals to discharge control circuitry 7b and charge control circuitry 7c to disconnect the battery cells 7h by changing the state of FETs 7f, 7g, (e.g., electronic switches) for example.

Further, the BMS controller 7a may be configured and operable to detect the voltages being applied to the battery cells 7h.

In an embodiment, the BMS controller 7a may be operable to compare a sensed voltage being applied to the cells 7h and compare the sensed voltage to one or more thresholds (e.g., stored thresholds). For example, if the controller 7a determines that the amount of sensed voltage is greater than a maximum threshold (e.g., 3.6 V) then the BMS controller 7a may be operable to send electronic signals to charge control circuitry 7c to disconnect the battery cells 7h by changing the state of FET 7g, (e.g., electronic switches) for example. Conversely, if the controller 7a determines that the amount of sensed voltage is lower than a minimum threshold (e.g., 2.5 V) then the BMS controller 7a may be operable to send electronic signals to discharge control circuitry 7b to disconnect the battery cells 7h by changing the state of FET 7f, (e.g., electronic switches) for example.

As mentioned previously, alternatively, the charger 2 may be connected to a source of DC input power signals (e.g., vehicle battery, DC power bank (not shown). Thereafter, the charger 2 may be operable to supply DC output power signals to charge one or more battery cells within subsystem 4b when the charger 2 is connected to the energy storage section 4 via cables 3.

In more detail, in yet another embodiment, the charger 2 may be operable to receive AC (power) input signals and output DC (power) output signals in order to supply energy to charge a DC power bank in less than 10 minutes (from completely discharged to a minimum, specified lower operational voltage of the battery cells 7h. Thus, when no external AC power source is available to help charge the battery cells, the DC power bank may be operable to supply energy (DC power output signals) to the battery cells in order to power the radio 6 for 60 hours of runtime.

Rather than include a DC power bank, in yet another embodiment the UPS power supply system 1 may include a DC charger with a CCCV isolated section, such as section 2c in FIG. 2. Such a DC charger may be connected to a DC power source (e.g., car cigarette lighter (15 A) or a direct DC connection to any car, truck or EMT vehicle). Such a system may provide DC power output signals to charge the battery cells of the subsystem 4b in less than 10 minutes (from fully discharged to fully charged)

Modifications of the disclosure will occur to those skilled in the art and to those who make or use the disclosure. Therefore, it is understood that the embodiments shown in the drawings and described above are merely for illustrative purposes and not intended to limit the scope of the disclosure.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited herein. For example, elements shown as integrally formed may be constructed of multiple parts, or elements shown as multiple parts may be integrally formed. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be further understood that any described processes, or steps within described processes, may be combined with other disclosed processes or steps to form structures within the scope of the present disclosure. The exemplary structures and processes disclosed herein are for illustrative purposes and are not to be construed as limiting.

It should be further understood that the features described above with respect to one embodiment illustrated by one figure, for example, may also be incorporated into another embodiment described herein and/or shown in a different figure. For the sake of clarity, however, such features have not been repeated for each other embodiment.

I claim:

1. An uninterruptible power supply (UPS) system comprising:
   a charger configured to receive AC power input signals from a main power source and generate DC power output signals; and
   an energy storage system coupled to the charger and comprising a lithium iron phosphate (LFP) composition configured to be charged by the DC power output signals at a 6C rate from a fully discharged state to a fully charged state in less than 10 minutes, wherein the energy storage system is further configured to supply electrical power with a full UPS functionality at a constant regulated DC voltage to a portable radio when the charger is connected to, or disconnected from, the energy storage system.

2. The UPS system as in claim 1 wherein the energy storage system comprises a battery subsystem, wherein the ratio of a runtime to a charge time of the battery subsystem is at least 60 to 1.

3. The UPS system as in claim 2 wherein the battery subsystem is configured to provide the radio an operational uptime of 98%.

4. The UPS system as in claim 2, wherein the battery subsystem comprises one or more battery cells.

5. The UPS system as in claim 4 wherein each of the battery cells is composed of the LCP composition configured to be charged at the 6C rate from the fully discharged state to the fully charged state in less than said 10 minutes without deleteriously affecting the cycle life of the battery cells.

6. The UPS system as in claim 5 wherein each of the battery cells is configured to have a capacity of 2,500 to 2,600 milliamp hours.

7. The UPS system as claimed in claim 1, wherein the charger is configured with a specific power density equal to or greater than 1080 watts per liter, and wherein the charger is further configured to output a DC output power signal rated at 7.3 volts, 15 amps, and 110 watts.

8. A UPS system comprising:
   a charger configured to receive DC power input signals from a main power source and generate DC power output signals; and
   an energy storage system coupled to the charger comprising a lithium iron phosphate (LFP) composition and configured to be charged by the DC power output signals at a 6C rate from a fully discharged state to a fully charged state in less than 10 minutes, wherein the energy storage system is further configured to supply electrical power with a full UPS functionality at a constant regulated DC voltage to a two-way, portable radio when the charger is connected to, or disconnected from, the energy storage system.

9. The UPS system as in claim 8 wherein the main power source comprises a battery of a vehicle.

10. The UPS system as in claim 8 wherein the main power source comprises a DC power bank.

11. The UPS system as in claim 10 wherein the energy storage system is configured to supply power to the radio to allow the radio to operate for 50 hours.

12. The UPS system as in claim 8 wherein the energy storage system comprises a battery subsystem, wherein the ratio of a runtime to a charge time of the battery subsystem is at least 60 to 1.

13. The UPS system as in claim 12 wherein the battery subsystem is configured to provide the radio an operational uptime of 98%.

14. The UPS system as in claim 8 wherein the energy storage system comprises a battery subsystem, wherein each battery cell within the battery subsystem is composed of the LCP composition configured to be charged at the 6C rate from the fully discharged state to the fully charged state in less than said 10 minutes without deleteriously affecting the cycle life of the battery cells.

15. A method for uninterruptibly powering a portable radio comprising:
   receiving AC power input signals from a main power source and generating DC power output signals using a charger; and
   coupling the generated DC power output signals to an energy storage system comprising a lithium iron phosphate (LFP) composition;
   charging the LFP composition using the coupled DC power output signals at a 6C rate from a fully discharged state to a fully charged state in less than 10 minutes;
   supplying electrical power with a full UPS functionality at a constant regulated DC voltage to the portable radio when the charger is connected to, or disconnected from, the energy storage system.

16. A method for uninterruptibly powering a portable radio comprising:
   receiving DC power input signals from a main power source and generating DC power output signals using a charger; and
   coupling the generated DC power output signals to an energy storage system comprising a lithium iron phosphate (LFP) composition;
charging the LFP composition using the coupled DC power output signals at a 6C rate from a fully discharged state to a fully charged state in less than 10 minutes;
supplying electrical power with a full UPS functionality at a constant regulated DC voltage to the portable radio when the charger is connected to, or disconnected from, the energy storage system.

* * * * *